United States Patent

Klinghult et al.

(10) Patent No.: US 9,791,950 B2
(45) Date of Patent: Oct. 17, 2017

(54) LIQUID CRYSTAL DISPLAY

(75) Inventors: Gunnar Klinghult, Lund (SE); Peter Åberg, Vinslöv (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 175 days.

(21) Appl. No.: 14/236,656

(22) PCT Filed: Aug. 31, 2011

(86) PCT No.: PCT/EP2011/004390
§ 371 (c)(1),
(2), (4) Date: Mar. 20, 2014

(87) PCT Pub. No.: WO2013/029642
PCT Pub. Date: Mar. 7, 2013

(65) Prior Publication Data
US 2014/0240621 A1    Aug. 28, 2014

(51) Int. Cl.
*G02F 1/1333* (2006.01)
*G06F 3/041* (2006.01)
*G06F 3/044* (2006.01)
*G06F 3/045* (2006.01)

(52) U.S. Cl.
CPC ........ *G06F 3/0412* (2013.01); *G02F 1/13338* (2013.01); *G06F 3/044* (2013.01); *G06F 3/045* (2013.01); *G06F 3/0414* (2013.01)

(58) Field of Classification Search
CPC .............................. G06F 3/044; G02F 1/13338
See application file for complete search history.

(56) References Cited

U.S. PATENT DOCUMENTS

2005/0024328 A1*  2/2005  Oldfield .............. G06F 3/04886
                                                  345/157
2009/0096765 A1    4/2009  Kuo et al.
2009/0189875 A1*  7/2009  Ma ....................... G06F 3/0416
                                                  345/174

(Continued)

FOREIGN PATENT DOCUMENTS

CN     101727231 A     6/2010
CN     102135673 A     7/2011

(Continued)

OTHER PUBLICATIONS

International Search Report and Written Opinion from corresponding International Application No. PCT/EP2011/004390, mailed on May 2, 2012.

*Primary Examiner* — Michael Caley
*Assistant Examiner* — Jia Pan
(74) *Attorney, Agent, or Firm* — Renner, Otto, Boisselle & Sklar, LLP

(57) ABSTRACT

A liquid crystal display with a force sensitive display surface has a liquid crystal layer between a liquid crystal control layer and a window layer. A color filter layer with color filters or a 3D filter layer with 3D barrier units may be provided between the liquid crystal layer and the window layer. The control, window, color or 3D filter layer comprises an electrically conductive sensor structure comprising piezoresistive material for sensing the force applied by a user's finger on the display, and the sensor structure may, additionally, provide capacitance varying for sensing the touch position.

6 Claims, 4 Drawing Sheets

(56) References Cited

U.S. PATENT DOCUMENTS

| | | | |
|---|---|---|---|
| 2009/0309616 A1 | 12/2009 | Klinghult et al. | 324/686 |
| 2010/0123686 A1 | 5/2010 | Klinghult et al. | 345/178 |
| 2010/0128002 A1* | 5/2010 | Stacy | G06F 3/016 345/174 |
| 2010/0188371 A1* | 7/2010 | Lowles | G06F 3/04886 345/178 |
| 2010/0201635 A1* | 8/2010 | Klinghult | G06F 3/0414 345/173 |
| 2010/0225612 A1* | 9/2010 | Ishizaki | G02F 1/13338 345/174 |
| 2010/0328239 A1* | 12/2010 | Harada | G06F 3/0412 345/173 |
| 2011/0148859 A1* | 6/2011 | Huang | G06F 3/0304 345/419 |
| 2011/0216037 A1* | 9/2011 | Kang | G06F 3/041 345/174 |
| 2012/0105434 A1* | 5/2012 | Kuo | H04N 13/0409 345/419 |

FOREIGN PATENT DOCUMENTS

| | | |
|---|---|---|
| TW | 201003496 A | 1/2010 |
| WO | 2010/091744 A1 | 8/2010 |

* cited by examiner

LIQUID CRYSTAL DISPLAY

FIELD OF THE INVENTION

The present application relates to a liquid crystal display, especially to a liquid crystal display of a mobile portable device with a force sensitive display surface.

BACKGROUND OF THE INVENTION

Consumer products, for example mobile telephones, mobile navigation systems, mobile gaming devices and mobile media players, are looking for new input methods. Input methods in two dimensions, for example via a so-called touch panel, are commonly used today. The next natural step is to utilize the third dimension for input purposes. Utilizing the third dimension for input purposes can be realized for example by sensing a force being applied by a user on the touch panel in a perpendicular direction to the plane of the touch panel. Thus, a first and a second dimension are sensed by a touch position on the touch panel and the third dimension is sensed by the force being applied at the touch position. For sensing the force being applied to the touch panel, the touch panel or the display underneath the touch panel may be supported by force sensitive sensors. However, this may add additional costs to the product and may increase the size of the product.

Therefore, there is a need for sensing a force being applied to a touch panel or a display optimized in cost and installation space.

SUMMARY OF THE INVENTION

According to the present invention, this object is achieved by a liquid crystal display as defined in claims 1, 2, 3, 5 and 6, a touch sensitive user interface as defined in claim 10, and a device as defined in claim 12. The dependent claims define preferred and advantageous embodiments of the invention.

According to an aspect of the present invention, a liquid crystal display (LCD) comprising a layered structure is provided. The layered structure comprises a liquid crystal control layer comprising an electrically conductive control structure for driving liquid crystals, a liquid crystal layer comprising the liquid crystals, and a window layer comprising a transparent cover for covering the liquid crystal layer.

The liquid crystal control layer may comprise for example a glass panel on which the electrically conductive control structure is provided. The electrically conductive control structure may comprise for example so-called thin film transistors (TFT). The electrically conductive control structure may be adapted to generate an electrical field for aligning liquid crystals within the electrical field. The electrically conductive control structure may be arranged such that the electrical field can be generated individually for a plurality of areas within the liquid crystal layer forming a matrix of so-called picture elements (pixels) which can be individually controlled by driving the liquid crystals belonging to a pixel.

The window layer comprises an electrically conductive sensor structure comprising or made of a force sensitive material. The force sensitive material may comprise for example a piezoresistive material. A piezoresistive material changes an electrical resistance due to a contraction or strain of the material. For a piezoresistive material the change in resistance due to a contraction may be around hundred times the change for normal metals. The electrically conductive sensor structure is adapted to provide a capacitance varying in response to a change in its surrounding environment. For example, when a user approaches or touches the window layer with a finger, this change in environment varies the capacitance of the electrically conductive sensor structure. Thus, a touch and a touch position of a user touching the window layer may be determined. The electrically conductive sensor structure is further adapted to provide a resistance varying in response to a force being applied to the window layer due to a change of a strain of the force sensitive material. Thus, a pressure force being applied to the window layer slightly deforming the window layer can be determined from the change in resistance of the electrically conductive sensor structure.

By using a force sensitive material on the window layer for both purposes, a capacitive touch position determination and a force determination, a three-dimensional input method can be realized sensing a touch position in a two-dimensional plane of the window layer and a force being applied substantially perpendicular to the plane of the window layer in the third dimension. Therefore, no additional construction space is needed for additional force sensors and the force sensing can be realized at low cost.

According to another aspect of the present invention, a liquid crystal display with a layered structure comprising the above-mentioned liquid crystal control layer, liquid crystal layer, and window layer is provided. The liquid crystal control layer comprises the electrically conductive control structure for driving the liquid crystals and additionally an electrically conductive sensor structure comprising a force sensitive material. The electrically conductive sensor structure is adapted to provide a resistance varying in response to a force being applied to the liquid crystal control layer. By integrating the force sensing into the control layer, no additional construction space for sensing a force being applied on the liquid crystal control layer is needed. As the layers of a liquid crystal display are one on top of the other, a force being applied by a user on an upper layer of the display, for example the window layer, is forwarded through all layers and thus also the liquid crystal control layer is deformed due to the force applied by the user. This changes a strain in the force sensitive material and may be detected to determine the force being applied to the display.

According to yet another aspect of the present invention, a liquid crystal display comprises a layered structure comprising a liquid crystal control layer, a liquid crystal layer and a color filter layer. The liquid crystal display may comprise further layers, for example the above-mentioned window layer or a backlight layer. The liquid crystal control layer comprises an electrically conductive control structure for driving the liquid crystals of the liquid crystal layer and the color filter layer comprises a color filter.

Furthermore, the color filter layer covers the liquid crystal layer. The color filter layer may be used to realize a color display by assigning each pixel a specific color, for example a red color, a green color or a blue color. Thus, when light from the backlight layer is passing through the liquid crystal layer and the color filter layer, a pixel may emit either red light, green light or blue light depending on the color filter assigned to the pixel or sub-pixel. By controlling the amount of light passing through the liquid crystal layer for each pixel, a colored output of the liquid crystal display can be accomplished. Besides the color filter, the color filter layer comprises an electrically conductive sensor structure comprising a force sensitive material. The electrically conductive sensor structure is adapted to provide a resistance varying a response to a force being applied to the color filter layer. Therefore, a force being applied to the color filter layer may be sensed and determined due to a change in strain of the force sensitive material. As the electrically conductive sensor structure is integrated into the color filter layer, no additional construction space for accommodating force sensors is needed and therefore a small size of the liquid crystal display can be accomplished. Furthermore, only relatively low costs are added to the liquid crystal display by adding the electrically conductive sensor structure to the color filter layer.

According to an embodiment, the electrically conductive sensor structure of the color filter layer is additionally adapted to provide a capacitance varying in response to a change in its surrounding environment. Thus, the electrically conductive sensor structure of the color filter layer may be additionally used for capacitive sensing a touch position of a user touching the display surface.

According to another aspect of the present invention, a liquid crystal display comprising a layered structure is provided. The layered structure comprises a liquid crystal control layer comprising an electrically conductive control structure for driving liquid crystals, a liquid crystal layer comprising the liquid crystals, and a window layer comprising a transparent cover for covering the liquid crystal layer. The electrically conductive control structure of the liquid crystal control layer comprises a force sensitive material and is adapted to provide a resistance varying in response to a force being applied to the liquid crystal control layer. As explained above, the electrically conductive control structure is used for driving the liquid crystals, for example via thin film transistors provided for each color of each pixel. The thin film transistors may be arranged in a matrix electrically coupled by conductive row and column lines. Some of the conductive row and column lines may be made of the force sensitive material or additional conductive lines may be added to the electrically conductive control structure. As the force sensitive material is sensitive to a change in strain, a deformation of the liquid crystal control layer may be sensed by monitoring the resistance of the lines of force sensitive material. Therefore, the electrically conductive control structure of the liquid crystal control layer may be used for driving the liquid crystals as well as for sensing a force being applied to the liquid crystal control layer. Therefore, no additional construction space for accommodating force sensors is needed.

According to a further aspect of the present invention, a liquid crystal display comprises a layered structure comprising a liquid crystal control layer, a liquid crystal layer, and a 3D filter layer. The liquid crystal control layer comprises an electrically conductive control structure for driving liquid crystals and the liquid crystal layer comprises the liquid crystals. The 3D filter layer comprises 3D barrier units and an electrically conductive barrier control structure for controlling the 3D barrier units. The 3D barrier units may comprise for example further liquid crystals which may be driven by the electrically conductive barrier control structure. The 3D filter layer covers the liquid crystal layer. The 3D barrier units may be controlled by the electrically conductive control structure such that some pixels of the liquid crystal layer are visible from a first viewing angle only and some other pixels of the liquid crystal layer are visible from a second viewing angle only which is different to the first viewing angle. Therefore, different images may be provided by the liquid crystal display to the left eye and the right eye of a user looking at the liquid crystal display. Thus, a three-dimensional (3D) viewing experience may be accomplished. The electrically conductive barrier control structure comprises a force sensitive material and is adapted to provide a resistance varying in response to a force being applied to the 3D filter layer. Therefore, no additional construction space for providing force sensors is needed.

According to an embodiment, the liquid crystal display comprises furthermore a touch panel layer comprising an electrically conductive touch sensor structure. The electrically conductive touch sensor structure is adapted to provide a capacitance varying in response to a change in its surrounding environment. Therefore, a two-dimensional touch position can be determined in addition to the force being applied in the third dimension and sensed by the force sensitive material as explained above. Furthermore, the touch panel layer may comprise other touch sensor structures, for example a resistive touch sensor structure, an optical touch sensor structure or an infrared touch sensor structure.

The force sensitive material mentioned above may comprise for example an indium tin oxide, a conducting polymer or carbon nano tubes. An electrically conductive structure made of indium tin oxide provides a high degree of transparency and may be therefore arranged in front of the liquid crystal layer which means that the electrically conductive structure of indium tin oxide is located between the liquid crystal layer and a user looking at the display.

According to another aspect of the present invention, a touch sensitive user interface comprising a liquid crystal display as described above and a processing unit is provided. The processing unit is coupled to the electrically conductive structures of the liquid crystal display and adapted to determine a touch position of a user touching the liquid crystal display based on the varying capacitance and is furthermore adapted to determine a force being applied by the user to the liquid crystal display based on the varying resistance. Therefore, a touch sensitive user interface for sensing a three-dimensional input information can be realized. Two dimensions are sensed by the touch position and the third dimension is sensed by the force.

According to an embodiment, the processing unit is adapted to perform the determination of the touch position, the determination of the force and a control of the liquid crystals in a synchronized manner. Preferably, the determination of the touch position, the determination of the force and the control of the liquid crystals is performed in a time multiplexed manner. This may reduce a noise level in each of the determinations from the control of the liquid crystals. Even if separate conductive structures are used for the force sensing and the determination of the touch position and the control of the liquid crystals, a synchronization may help to reduce the noise level of each.

According to another aspect of the present invention, a device comprising the above-described touch sensitive user interface is provided. The device comprises a mobile phone, a personal digital assistant, a mobile music player, a mobile media player, a mobile navigation system, etc. As especially in these consumer products complex and intuitive input methods are needed and the construction space for accommodating components is restricted, the above-described touch sensitive user interface can be utilized advantageously.

Although specific features described in the above summary and the following detailed description are described in connection with specific aspects and embodiments, it is to be understood that the features of the aspects and embodiments may be combined with each other unless specifically noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It is to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise. Same reference signs in the various drawings and the following description refer to similar or identical components.

Figure 1:
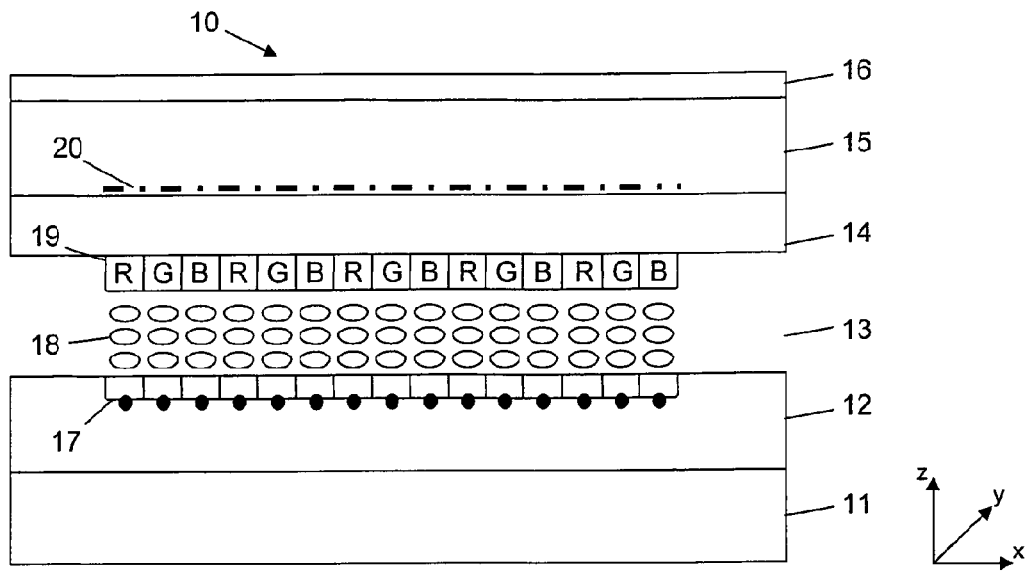
FIGS. 1-6 show schematically cross-sectional views of liquid crystal displays according to embodiments of the present invention.

FIG. 1 shows a cross-sectional view of a liquid crystal display 10. The liquid crystal display 10 has a layered structure comprising a backlight layer 11, a liquid crystal control layer 12, a liquid crystal layer 13, a color filter layer 14, a window layer 15 and an anti-splinter film layer 16. The backlight layer 11 may comprise a backlight for illuminating the liquid crystal display 10 as it is known in the art, for example a so-called LED-backlight. The backlight layer 11 emits light in the z direction through the upper layers 12-16. The liquid crystal control layer 12 may comprise for example a glass panel on which thin film transistors 17 are arranged. Furthermore, an electrically conductive control structure connecting the thin film transistors 17 is arranged on the glass panel. The thin film transistors 17 may be arranged in a matrix in the x and y direction. The liquid crystal control layer 12 is adapted to generate an electrical field for individually influencing an alignment of liquid crystals 18 in the liquid crystal layer 13 above each thin film transistor 17. Thus, the amount of light from the backlight layer 11 passing through the liquid crystal layer 13 may be individually controlled for a plurality of individual areas, so-called picture elements or pixels, by the thin film transistors 17 and the liquid crystals 18. The color filter layer 14 provides for each thin film transistor 17 an individual color filter 19 which passes for example only red, green or blue light or a mix of these colors. The window layer 15 comprises for example a further glass panel giving the liquid crystal display 10 a mechanically robust cover. Furthermore, an anti-splinter film of the anti-splinter film layer 16 may help to protect a user from being injured by broken fragments of the window layer 15 when the glass panel of the window layer 15 is broken.

For enabling a touch sensitive user interface which is adapted to recognize a touch position on the upper side of the liquid crystal display 10 in the x and y direction and to recognize a force being applied by a user on the liquid crystal display 10 as a pressure in the negative z direction, an electrically conductive sensor structure comprising a force sensitive material may be arranged at one of the following layers or may be integrated into one of the following existing electrically conductive structures. The force sensitive material may comprise for example a piezoresistive material. In the following description a piezoresistive material will be used as the force sensitive material. However, any other force sensitive material may be used instead.

As shown in FIG. 1, the window layer 15 may comprise an electrically conductive sensor structure 20 comprising the piezoresistive material. The electrically conductive sensor structure 20 is adapted to provide a capacitance varying in response to a change in its surrounding environment thus providing a capacitive touch layer. As the electrically conductive sensor structure comprises the piezoresistive material, the electrically conductive sensor structure is furthermore adapted to provide a resistance varying in response to a force being applied to the window layer 15, e.g in the negative z direction. Therefore, the conductive structure of the capacitive touch layer integrated in the liquid crystal display 10 is used to also measure the force from a user's finger applied to the liquid crystal display 10.

Figure 2:
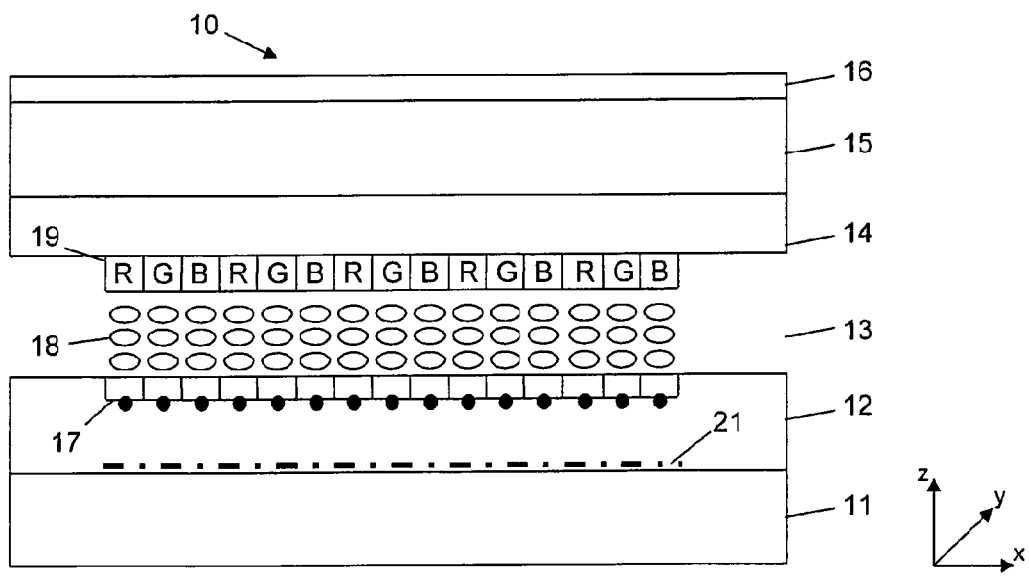

FIG. 2 shows another embodiment in which in the liquid crystal control layer 12 comprises an electrically conductive sensor structure 21 comprising a piezoresistive material is additionally integrated. The electrically conductive sensor structure 21 is adapted to provide a resistance varying in response to a force being applied to the liquid crystal control layer 12. In this case, the piezoresistive material in the liquid crystal control layer is used for force sensing only. For capacitive sensing a touch position, a corresponding electrically conductive structure may be provided for example at the window layer 15. Furthermore, the electrically conductive sensor structure 21 may be used as one side of a capacitive layer of a capacitive touch sensor.

Figure 3:
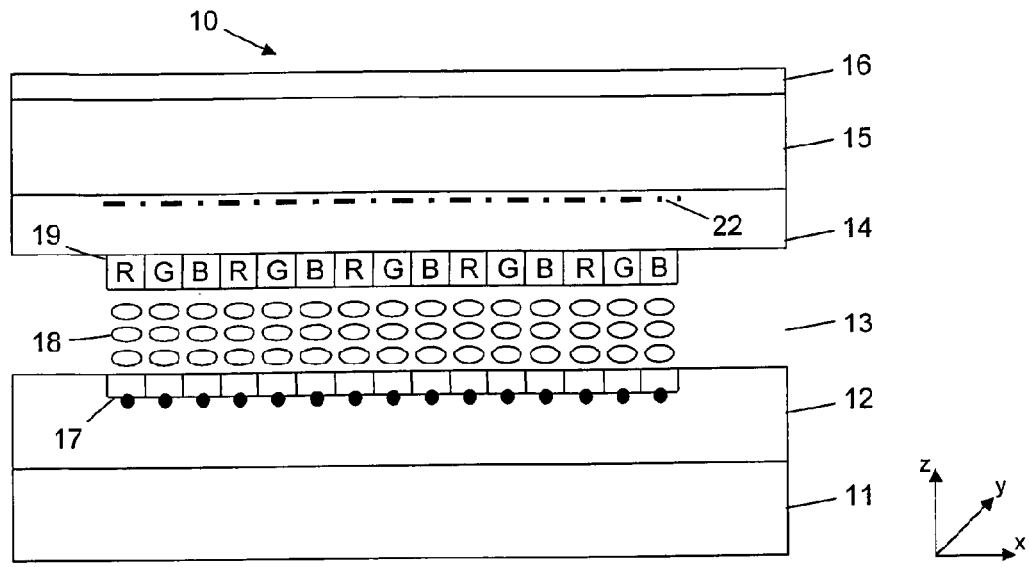

FIG. 3 shows a further embodiment in which an electrically conductive sensor structure 22 is integrated at an upper side of the color filter layer 14. The electrically conductive sensor structure 22 comprises a piezoresistive material, for example an indium tin oxide (ITO). The electrically conductive sensor structure 22 is adapted to provide a resistance varying in response to a force being applied to the color filter layer 14. Thus, a force applied to the anti-splinter film layer 16 is forwarded through the window layer 15 to the color filter layer 14 and can be sensed by the electrically conductive sensor structure 22. For capacitive sensing the touch position in the x and y direction where the user touches the liquid crystal display 10, an additional electrically conductive structure may be provided for example in the window layer 15.

Figure 4:
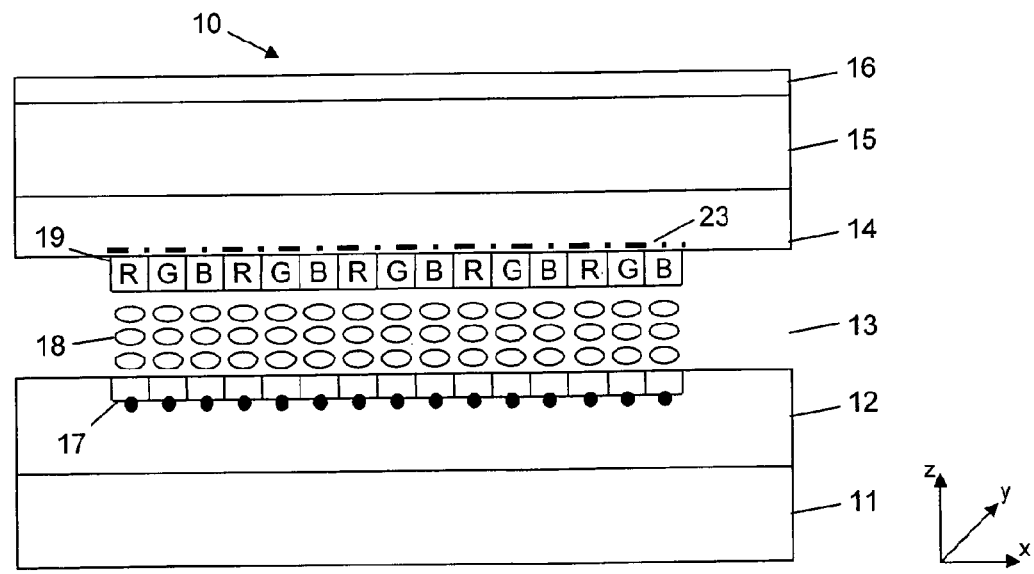

Furthermore, as shown in FIG. 4, an electrically conductive sensor structure 23 comprising a piezoresistive material may also be arranged at a lower side of the color filter 14. Furthermore, the electrically conductive sensor structure 22 or the electrically conductive sensor structure 23 may also be adapted to provide a capacitance varying in response to a change in its surrounding environment and may therefore be adapted to the detect a touch position in the x and y direction where the user touches the liquid crystal display 10 in addition to a detection of a force being applied by the user in the z direction.

Figure 5:
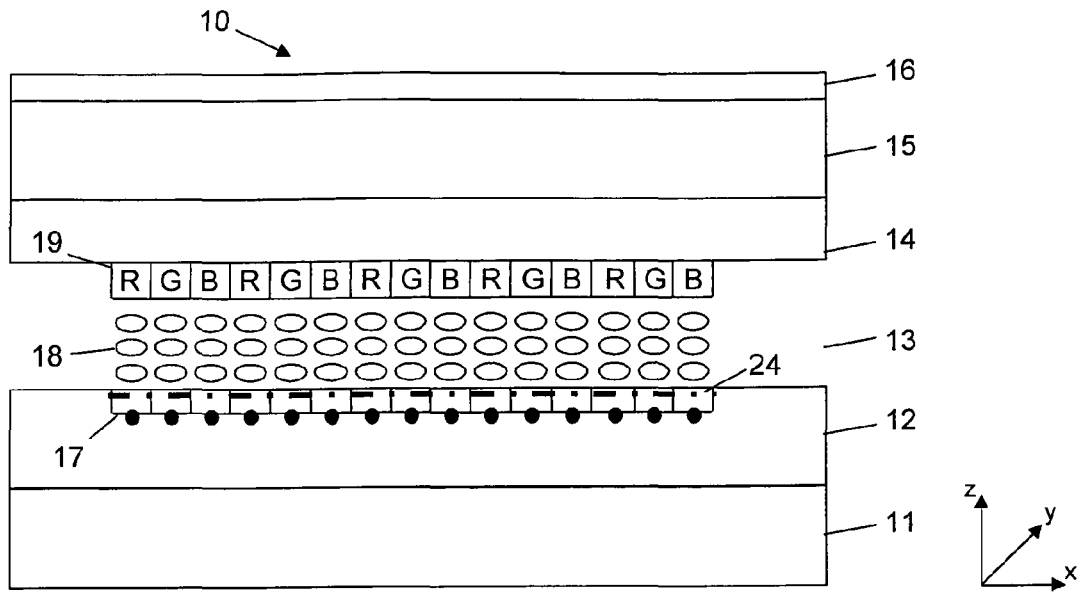

FIG. 5 shows a further embodiment of a liquid crystal display 10. According to this embodiment, the electrically conductive control structure 24 of the liquid crystal control layer 12 which connects the thin film transistors 17 is made of or comprises a piezoresistive material. Therefore, the electrically conductive control structure 24 is adapted to provide a resistance varying in response to a force being applied to the liquid crystal control layer 12. This resistance may be used to detect a force being applied in the z direction on the liquid crystal display 10. Thus, the electrically conductive structure for driving the liquid crystals 18 is reused for detecting the force applied to the liquid crystal display 10. The liquid crystal control layer 12 comprises a further electrically conductive control structure which is located above the liquid crystals 18 such that the liquid crystals 18 are arranged sandwiched between the liquid crystal control layer 12 connecting the thin film transistors 17 and the further electrically conductive control structure (the further electrically conductive control structure is not shown in FIG. 5). An electrical field may be generated under control of the thin film transistors between the further electrically conductive control structure and the liquid crystal control layer connecting the thin film transistors for controlling an alignment of the liquid crystals 18. The further electrically conductive control structure arranged above the liquid crystals 18 may be made of or may comprises a piezoresistive material. Therefore, the further electrically conductive control structure may be adapted to provide a resistance varying in response to a force being applied to the liquid crystal display 10.

Figure 6:
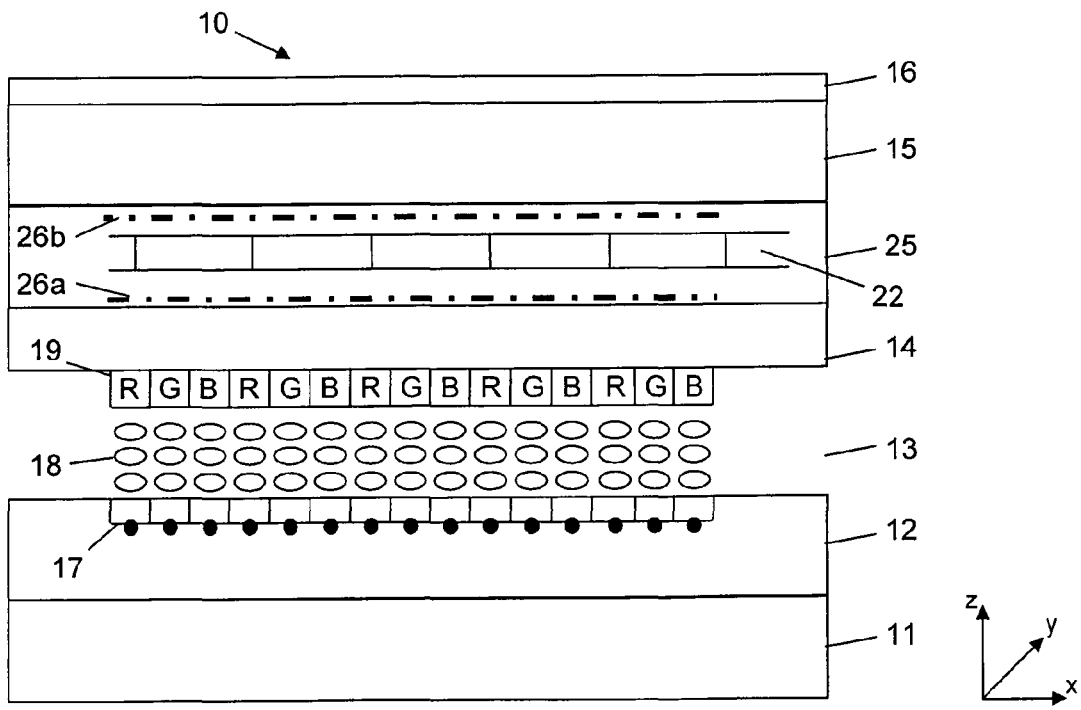

FIG. 6 shows a further embodiment of a liquid crystal display 10. The liquid crystal display 10 shown in FIG. 6 provides an additional 3D filter layer 25. The 3D filter layer 25 comprises 3D barrier units 22 and an electrically conductive barrier control structure 26a, 26b for controlling the 3D barrier units 22. The electrically conductive barrier control structure comprises a first control structure 26a below the barrier units 22 and a second control structure 26b above the barrier units 22. An electrical field generated between the two layers 26a and 26b may align the barrier units. The 3D barrier units may be controlled by the electrically conductive control structure 26a, 26b such that some pixels of the liquid crystal layer 13 are visible from a first viewing angle only and some other pixels of the liquid crystal layer 13 are visible from a second viewing angle only. The first and the second viewing angles are selected such that due to a parallax of human eyes some pixels are only visible for the left eye and some other pixels are only visible for the right eye of a user looking at the liquid crystal display 10. Thus, different images can be presented to the user's eyes and this can be used to establish a three-dimensional viewing experience for the user. When the 3D barrier units 22 are inactive, the liquid crystal display 10 works as a two-dimensional display device only. The first control structure 26a and/or the second control structure 26b comprises a piezoresistive material. The electrically conductive barrier control structure 26a, 26b is therefore adapted to provide a resistance varying in response to a force being applied to the 3D filter layer 25. Furthermore, the electrically conductive barrier control structure 26a, 26b may be used to capacitively detect the touching position in the x and y direction. As an alternative, the window layer 15 may provide an electrically conductive structure for capacitively sensing a touch position in the x and y direction.

Figure 7:
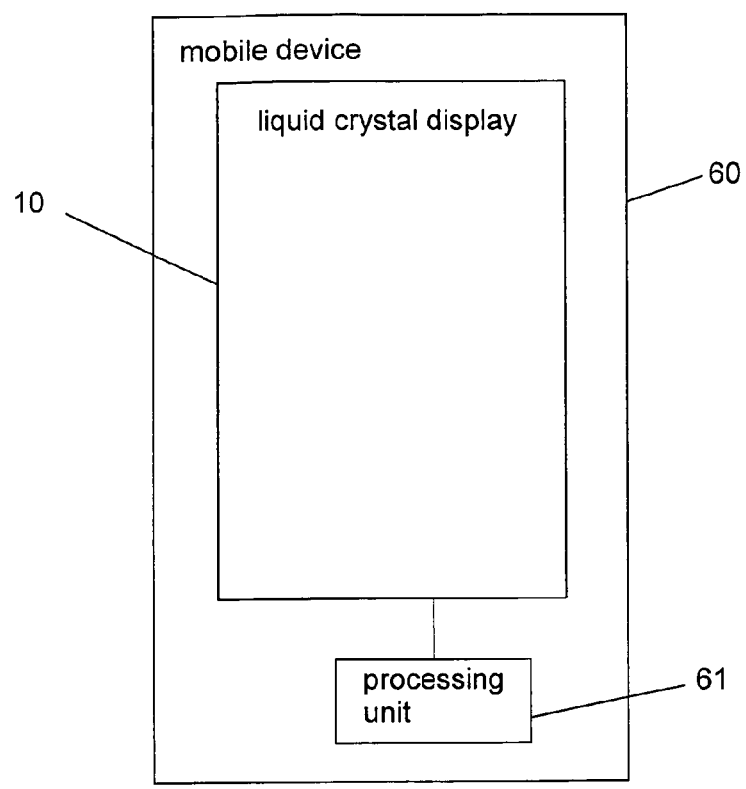
FIG. 7 shows schematically a mobile device according to an embodiment of the present invention.

FIG. 7 shows a mobile device 60 comprising the liquid crystal display 10 as described above and a processing unit 61. The processing unit 61 is coupled to the electrically conductive structures of the liquid crystal display 10 and adapted to determine a touching position of a user touching the liquid crystal display 10 based on the varying capacitance and to determine a force being applied by the user on the surface of the liquid crystal display 10 based on the varying resistance. The sampling of the touch sensing and the force sensing might be synchronized with the pixel sampling. This may result in a significant lower noise floor and may also reduce the need for a screening between the layers. Due to the fact that the force sensing as well as the capacitive touch position sensing is integrated into the existing liquid crystal display layers, a lower building height of the liquid crystal display can be achieved. Furthermore, cost may be reduced, as the number of electrically conductive structures may be reduced. Although in FIG. 7 a common processing unit 61 is shown, separate processing units may be provided for driving the liquid crystal display 10, determining the touch position and determining the force.

While exemplary embodiments have been described above, various modifications may be implemented in other embodiments. For example, the above-described arrangements of the electrically conductive structures comprising the piezoelectric material may also be integrated into a non-color liquid crystal display which does not provide the color filter layer 14. Furthermore, any piezoresistive material may be used, for example indium tin oxide or a conducting polymer or any other material providing electrical properties which may be used for force sensing as described above. Moreover, any layer of a display with conductive wires may be used for force sensing and any combination of layers for touch sensing, driving the display, driving the 3D barrier unit, and force sensing may be used.

Finally, it is to be understood that all the embodiments described above are considered to be comprised by the present invention as it is defined by the appended claims.

The invention claimed is:

1. A touch sensitive user interface, comprising:
   a liquid crystal display comprising a layered structure comprising:
      a liquid crystal control layer comprising an electrically conductive control structure for driving liquid crystals,
      a liquid crystal layer comprising the liquid crystals,
      a color filter layer located between the liquid crystal layer and a window layer, the color filter layer comprising a color filter and covering the liquid crystal layer, and
      a touch panel layer comprising an electrically conductive touch sensor structure, the electrically conductive touch sensor structure being adapted to provide a capacitance varying in response to a change in its surrounding environment,
      wherein the color filter layer comprises an electrically conductive sensor structure comprising a force sensitive material, the electrically conductive sensor structure being adapted to provide a resistance varying in response to a force being applied to the color filter layer, and
      wherein the electrically conductive sensor structure is located at a side of the color filter layer that is closer to the window layer than the liquid crystal layer, and
   a processing unit coupled to the electrically conductive touch sensor structure of the touch panel layer and the electrically conductive sensor structure of the color filter layer of the liquid crystal display and adapted to determine a touching position of a user touching the liquid crystal display based on a capacitance varying in response to a change in its surrounding environment, and to determine a force being applied by the user on the liquid crystal display based on the varying resistance.

2. The touch sensitive user interface according to claim 1, wherein the electrically conductive sensor structure is additionally adapted to provide a capacitance varying in response to a change in its surrounding environment.

3. The touch sensitive user interface as defined in claim 1, wherein the force sensitive material comprises a piezoresistive material.

4. The touch sensitive user interface as defined in claim 1, wherein the force sensitive material comprises at least one of indium tin oxide, a conducting polymer, or carbon nano tubes.

5. The touch sensitive user interface according to claim 1, wherein the processing unit is adapted to perform the determination of the touch position, the determination of the force and a control of the liquid crystals in a time multiplexed manner.

6. A device comprising a touch sensitive user interface according to claim 1, wherein the device comprises at least one device comprising a mobile phone, a personal digital assistant, a mobile music player, or a navigation system.

* * * * *